US009641802B2

(12) United States Patent
Zino et al.

(10) Patent No.: US 9,641,802 B2
(45) Date of Patent: May 2, 2017

(54) VIDEO SESSION MANAGER AND METHOD FOR ENABLING AND MANAGING VIDEO CALLING AND TELEPRESENCE COMMUNICATIONS SESSIONS ACROSS MULTIPLE DOMAINS

(71) Applicant: Tata Communications (America) Inc., Herndon, VA (US)

(72) Inventors: Galeal Zino, Salisbury, NC (US); James Karanassos, Manasquan, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 0 days.

(21) Appl. No.: 15/141,566

(22) Filed: Apr. 28, 2016

(65) Prior Publication Data

US 2016/0249016 A1    Aug. 25, 2016

Related U.S. Application Data

(63) Continuation of application No. 14/378,297, filed as application No. PCT/US2013/025576 on Feb. 12, 2013, now Pat. No. 9,350,942.
(Continued)

(51) Int. Cl.
*H04N 7/15*    (2006.01)
*H04N 7/14*    (2006.01)
(Continued)

(52) U.S. Cl.
CPC .......... *H04N 7/152* (2013.01); *H04L 12/1818* (2013.01); *H04L 65/1069* (2013.01);
(Continued)

(58) Field of Classification Search
CPC ...................................................... H04N 7/152
(Continued)

(56) References Cited

U.S. PATENT DOCUMENTS 5,990,945 A    11/1999    Sinha et al.
6,035,017 A *    3/2000    Fenton .................. H04M 3/533
                                                                    379/88.04
(Continued)

OTHER PUBLICATIONS

"European Extended Search Report", issued in EP patent application No. 13748666.8, dated Oct. 12, 2015, Published in: EP.
(Continued)

*Primary Examiner* — Gerald Gauthier
(74) *Attorney, Agent, or Firm* — Kaplan Breyer Schwarz & Ottesen, LLP

(57) ABSTRACT

A video session manager and method for enabling, optimizing and managing inter-domain video calling, telepresence and videoconferencing sessions, in exclusive video sessions, or within multi-modal communications sessions. The video session manager and method is operative for receiving and analyzing a communications session request from one or more endpoints (users); determining the viability of a communication session based on one or more attributes of the session; connecting the one or more requesting endpoints to start the session; continuously or periodically monitoring the session for problems with or changes in the session; and altering the parameters of the session in accordance with one or more predetermined policies, if a problem or change is detected, in order to maintain the viability of the session.

19 Claims, 9 Drawing Sheets

Related U.S. Application Data

(60) Provisional application No. 61/598,266, filed on Feb. 13, 2012.

(51) Int. Cl.
| | | |
|---|---|---|
| *H04L 12/18* | (2006.01) | |
| *H04N 21/647* | (2011.01) | |
| *H04N 21/4788* | (2011.01) | |
| *H04L 29/06* | (2006.01) | |

(52) U.S. Cl.
CPC .......... *H04L 65/1083* (2013.01); *H04N 7/14* (2013.01); *H04N 7/147* (2013.01); *H04N 7/148* (2013.01); *H04N 7/155* (2013.01); *H04N 21/4788* (2013.01); *H04N 21/647* (2013.01)

(58) Field of Classification Search
USPC .......... 348/14.08, 14.09, 441; 370/236, 352, 370/401; 379/202.01, 88.02, 88.04, 379/88.05, 196, 210.02, 265.02, 265.09, 379/265.11; 709/206, 218, 227; 713/168; 715/758; 717/120; 704/251
See application file for complete search history.

(56) References Cited

U.S. PATENT DOCUMENTS

| | | | |
|---|---|---|---|
| 6,611,590 B1* | 8/2003 | Lu | H04M 3/51 379/265.09 |
| 6,845,154 B1* | 1/2005 | Cave | H04M 3/5232 379/265.02 |
| 6,925,155 B2* | 8/2005 | Reynolds | H04M 3/493 379/265.01 |
| 6,970,553 B1* | 11/2005 | Gao | H04L 12/581 379/265.09 |
| 7,110,525 B1* | 9/2006 | Heller | H04M 3/523 379/265.11 |
| 7,130,405 B2* | 10/2006 | Brown | H04M 3/38 379/201.07 |
| 7,433,455 B1 | 10/2008 | Oran | |
| 7,477,282 B2 | 1/2009 | Firestone et al. | |
| 7,643,411 B2 | 1/2010 | Andreasen et al. | |
| 7,672,845 B2* | 3/2010 | Beranek | H04M 3/38 379/265.09 |
| 7,912,983 B1 | 3/2011 | Ward et al. | |
| 7,940,897 B2* | 5/2011 | Khor | G06Q 30/02 379/88.02 |
| 7,975,282 B2 | 7/2011 | Deshpande et al. | |
| 8,903,974 B2 | 12/2014 | Rajagopalan et al. | |
| 8,917,829 B2 | 12/2014 | Anderson | |
| 9,001,700 B2 | 4/2015 | Landau et al. | |
| 9,060,074 B2 | 6/2015 | Wagner et al. | |
| 9,350,942 B2* | 5/2016 | Zino | H04N 7/148 |
| 2002/0091832 A1* | 7/2002 | Low | G06Q 30/02 709/227 |
| 2002/0101979 A1* | 8/2002 | Borodow | H04L 29/06027 379/265.02 |
| 2003/0126464 A1 | 7/2003 | McDaniel et al. | |
| 2005/0091380 A1 | 4/2005 | Gonen et al. | |
| 2006/0034290 A1* | 2/2006 | Kalofonos | H04L 67/16 709/227 |
| 2007/0019797 A1* | 1/2007 | Morris | H04M 3/4288 379/202.01 |
| 2007/0286215 A1* | 12/2007 | Morris | H04L 63/102 370/401 |
| 2008/0019381 A1* | 1/2008 | Mills | H04L 63/166 370/401 |
| 2009/0013066 A1 | 1/2009 | Pecus | |
| 2009/0041013 A1 | 2/2009 | Mitchell et al. | |
| 2009/0138599 A1 | 5/2009 | Allin | |
| 2010/0131650 A1 | 5/2010 | Pok et al. | |
| 2010/0180041 A1 | 7/2010 | Thomas et al. | |
| 2010/0306676 A1* | 12/2010 | Srinivasaraghavan | G06Q 10/10 715/758 |
| 2010/0312897 A1 | 12/2010 | Allen et al. | |
| 2011/0213860 A1* | 9/2011 | Ezerzer | H04M 3/5191 709/218 |
| 2011/0258261 A1* | 10/2011 | Levy | H04L 47/12 709/206 |
| 2012/0076129 A1* | 3/2012 | Free | H04L 41/5054 370/352 |
| 2012/0151211 A1* | 6/2012 | Kreiner | H04L 63/102 713/168 |
| 2012/0287228 A1* | 11/2012 | Mishra | H04M 3/567 348/14.09 |
| 2013/0135523 A1* | 5/2013 | Ramalho | H04N 21/2402 348/441 |
| 2013/0163433 A1* | 6/2013 | Baldwin | H04L 65/1006 370/236 |
| 2013/0339927 A1* | 12/2013 | Fleming | G06F 8/70 717/120 |
| 2015/0002614 A1* | 1/2015 | Zino | H04N 7/148 348/14.08 |
| 2016/0249016 A1* | 8/2016 | Zino | H04N 7/148 |

OTHER PUBLICATIONS

Related International Patent Application No. PCT/US2013/025766, "International Search Report and Written Opinion", dated May 31, 2013, Publisher: US ISA/PCT, Published in: US.

Hogan, et al., "An architectural framework for the support of integrated services by broadband customer premises equipment", "Computer Networks and ISDN Systems", Apr. 1, 1997, pp. 595-610, vol. 29, No. 5, Publisher: Elsevier B.V.; doi:10.1016/SO169-7552(96)00122-5;XP004059230.

"Notice of Allowance" issued in U.S. Appl. No. 14/378,297, dated Jan. 25, 2016, Publisher: USPTO, Published in: US.

"Office Action" issued in U.S. Appl. No. 14/378,297, dated Oct. 6, 2015, Publisher: USPTO, Published in: US.

\* cited by examiner

TABLES

TABLE ONE - IDENTIFYING USER TWO
USER TWO NAME
USER TWO EMAIL ADDRESS
USER TWO PHONE OR VIDEO NUMBER
USER TWO URI OR VIDEO URI
USER TWO PROXY URI
USER TWO PIN OR PASSWORD
USER TWO THIRD PARTY ID OR ACCOUNT (E.G. OPENID, LINKEDIN, FACEBOOK, TWITTER)

TABLE TWO - SECONDARY AUTHENTICATION
SESSION ID
SESSION PIN OR PASSWORD
SESSION URI
SESSION QR CODE
USER ONE NAME
USER ONE EMAIL ADDRESS
USER ONE PHONE OR VIDEO NUMBER
USER ONE URI OR VIDEO URI
USER ONE PROXY URI
USER ONE PIN OR PASSWORD
USER ONE THIRD PARTY ID OR ACCOUNT (E.G. OPENID, LINKEDIN, FACEBOOK, TWITTER)

FIG. 5

VIDEO SESSION MANAGER AND METHOD FOR ENABLING AND MANAGING VIDEO CALLING AND TELEPRESENCE COMMUNICATIONS SESSIONS ACROSS MULTIPLE DOMAINS

RELATED APPLICATION

This application claims the benefit of U.S. Application No. 61/598,266 filed Feb. 13, 2012 and PCT Application No. PCT/US2013/025766 with an International filing date of Feb. 12, 2013, and the entire disclosures of both are incorporated herein by reference.

FIELD

The present disclosure relates to video calling, telepresence communications, and videoconferencing. More particularly, the present disclosure relates to a video session manager and method for enabling, optimizing and managing inter-domain video calling, telepresence and videoconferencing sessions, in exclusive video sessions, or within multi-modal communications sessions.

BACKGROUND

A domain may be a single organization, a closed user group, a company, or a community with logical (administration, policy, or management) and/or physical (network or security device) separation from the rest of the world. A single domain may include multiple zones with logical and/or physical demarcations. Examples of a single domain can include, without limitation, an enterprise with some LAN endpoints, some Internet-connected endpoints and some mobile endpoints, or an enterprise with endpoints within a single network that use different technology or protocols. Examples of different technology or protocols may include different types of signaling, such as SIP (Session Initiation Protocol), H.323, WebRTC (Web Real Time Communication), and TIP (Telepresence Interoperability Protocol), and different types of media codecs, such as H.264, H.265 and VP8.

When a communications session that includes video or telepresence is desired across multiple domains, or across zones within a domain, a series of problems arise that often prevent the communications session from being successfully executed, or attempted. These problems create a perception that the communications session will not work or will be too hard or costly, a perception that is often correct, and even when not, prevents the session from being attempted.

The problems that arise can be grouped into the following categories: 1) technology and capability; 2) connectivity and routing; 3) session authentication and initiation; 4) resources; and security and policy implementations. Technology and capability problems may include domains that use video and communications systems, which are not directly compatible with one another due to heterogeneous technologies, protocols and/or configurations. Certain capabilities, services, applications or data may not be available within each domain, or the domains may differ in these capabilities or in the implementation of these capabilities, e.g. data sharing protocols, encryption, collaboration tools, recording or presence. Consequently, in such a prior art system, the communications session may not work, or may not efficiently use those capabilities.

Connectivity and routing problems may include the absence of physical network connectivity layer two through layer five routing between the domains. In addition, connectivity and routing may not extend to cover all zones within the domains, for example, zones of mobile or Internet video endpoints.

Session authentication and initiation problems may include domains that do not have the capability to schedule, authenticate, initiate and/or launch the desired communication session because they may not have inter-domain directory, scheduling, authentication, initiation and/or launch services. Further, the domains may not have universal standards, methods and/or connectivity to leverage. For example, a video endpoint does not have a native capability to call any other video endpoint unlike a public switched telephone network (PSTN) where any PSTN telephone can call any other telephone. Session authentication and initiation is also an issue in applications that wish to incorporate video, e.g. web conferencing, workflow applications and customer call center type applications. In these types of applications, there are no standardized ways to incorporate standard video clients and endpoints.

Resource problems may include inadequate bandwidth, computing, bridging, MCU and/or like resources for video sessions, as prior art systems do not optimize the use of such resources between different domains and many of these resources are scarce, expensive and/or shared.

Security and policy implementation problems may include one or more domains that have extremely broad policy or security rules or implementations that may prohibit the sessions because prior art systems make inter-domain security policies impossible to implement and manage at a more granular and effective level.

Due to these and other limitations of prior art systems, inter-domain communications sessions that include video or telepresence, usually fail for one of a few reasons: 1) users assume that their inter-domain communications session cannot include video or telepresence endpoints outside of their domains so they do not attempt it; 2) users want to attempt an inter-domain communications session but do not know how to initiate and launch the session, e.g., how to call the other parties, and/or how to secure a bridge for multiple other parties; and 3) users attempt an inter-domain communications session but the capabilities are too low, the costs too high, and/or the user experience is too cumbersome and time consuming. Consequently, communications sessions that include inter-domain video are typically a very small percentage of today's enterprise video sessions. Similar problems are found inside large domains with multiple zones.

Accordingly, a need exists for improved technology and methods for executing and managing inter-domain communications sessions that include video or telepresence, which make it feasible for such sessions to be attempted, and to make attempted sessions successful. A similar need exists inside domains, particularly among domains that contain multiple zones.

SUMMARY

Disclosed herein is a method for visually communicating among endpoints. The method may comprise the steps of receiving, in a computer process, a request from an endpoint to commence a visual communications session with one or more other endpoints and matching, in a computer process, certain information contained in the request or received from the one or more other endpoints, to one of a plurality of visual communications session policies.

Also disclosed herein is a video session manager. The video session manager may comprise at least one processor executing instructions for receiving a request from an endpoint to commence a visual communications session with one or more other endpoints, and matching certain information contained in the request or received from the one or more other endpoints, to one of a plurality of visual communications session policies.

BRIEF DESCRIPTION OF THE DRAWINGS

FIG. 5 shows two tables (Table one and Table two). Table one lists information for enabling a first user to identify a second user and Table two lists secondary session authentication information that may be generated by the VSM for a desired communications session.

DETAILED DESCRIPTION

The video session manager (VSM) of the present disclosure manages communications sessions among multiple domains and/or among multiple zones in a domain. Without the VSM, the domains and/or zones would not be capable of interacting with one another in a communications session, due to variables such as the capabilities of the communications technology itself, the heterogeneous networks and the policies and architecture of each independent domain or zone, to name a few. When interfaced with the VSM, each domain and/or zone can continue to employ and operate its own methods and technology. In addition, the VSM enables inter-domain and/or inter-zone video and telepresence communications sessions among the domains and/or zones, respectively, which are viable and effective. In one embodiment, the VSM can include session management, resource management, policy, and routing components, for a variety of different communications sessions including, but not limited to, audio and/or video based communications sessions, and applications such as web conferencing and any third party software that wishes to incorporate video or voice. The VSM can physically and logically be inside a domain or in a neutral third party domain, such as a carrier domain.

Figure 1:
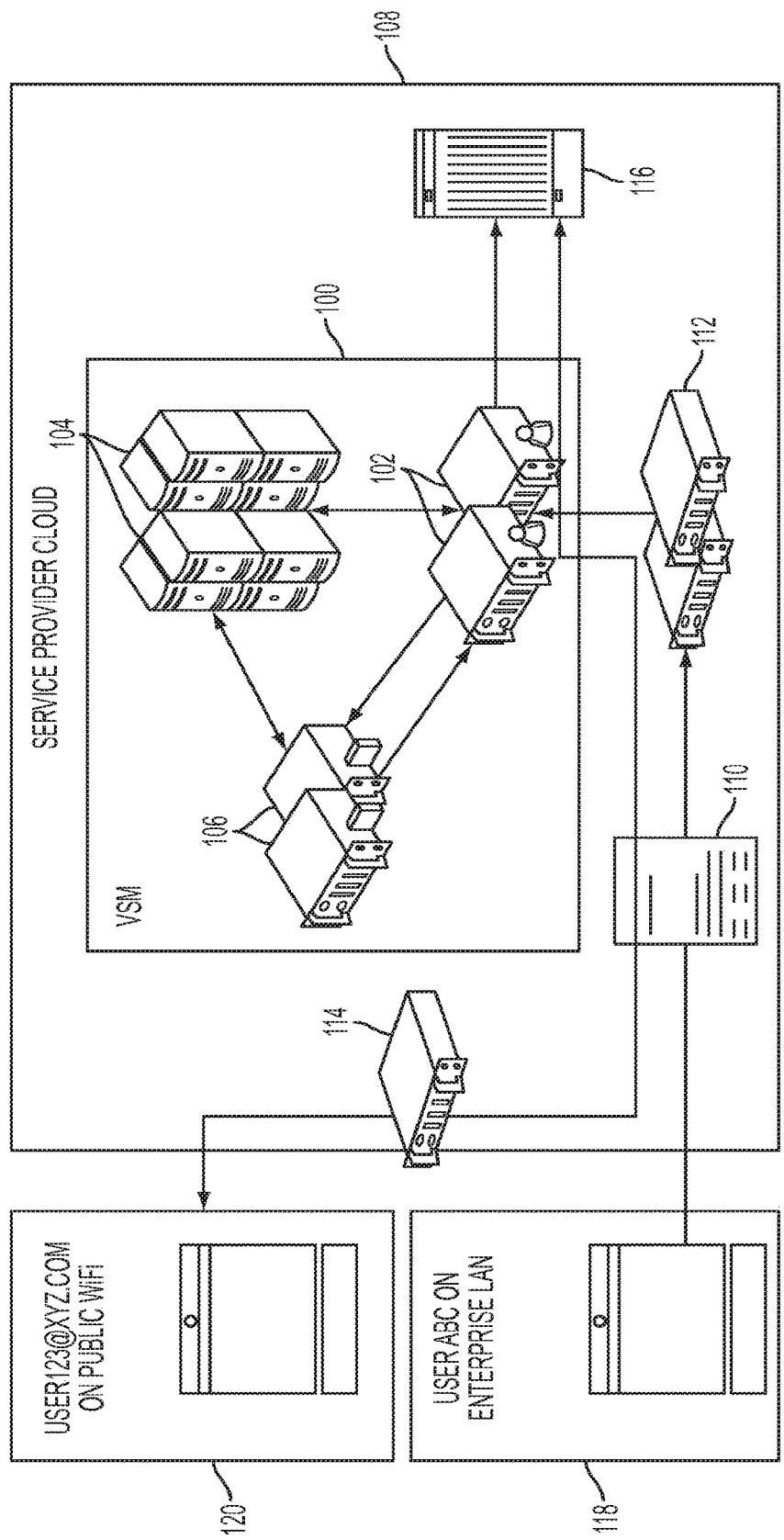
FIG. 1 is a block diagram of an embodiment of a video session manager of the (VSM) present disclosure.

The VSM, in one embodiment, may be constructed and adapted to perform one or more of the following functions: receive and analyze a communications session request (signaled by any telephony or web protocol) from one or more endpoints (users including, without limitation, software clients, hardware based endpoints, web clients running on mobile devices, and the like); determine the viability of a communication session based on one or more attributes of the session; connect the one or more requesting endpoints to start the session; continuously or periodically monitor the session for problems with or changes in the session; and alter the parameters of the session in accordance with one or more predetermined policies, if a problem or change is detected, in order to maintain the viability of the session. The VSM, in other embodiments, can also be constructed and adapted to initiate a communications session. FIG. 1 is a block diagram of a VSM according to an embodiment of the present disclosure. The VSM 100 may include one or more session managers 102, one or more backend servers 104, and an interactive voice response (IVR) system 106. The session managers 102, backend servers 104, and IVR system 106 may be constructed and adapted to communicate data with one another. The VSM 100 can be provided in a service provider (SP) cloud 108 as shown in FIG. 1. The SP cloud 108 can include a service provider router 110, one or more load balancers 112, a signaling server 114, and one or more media sources 116. The one or more media sources 116 can include multipoint control units (MCUs), bridges, proxy servers, gateways and any combination and number of media sources thereof. Two load balancers 112 and two session managers 102 are shown in the embodiment of FIG. 1, however, these components can scale to (n) horizontally and can be in different physical locations. Further, the components of the VSM 100 can be located together in a single physical "box," or distributed in the SP cloud 108. In addition, the VSM 100 and the other equipment shown in the SP cloud 108 can be located anywhere with a network connection. In some embodiments, the load balancers 112 and/or media sources 116 can be components of the VSM 100.

The VSM 100 can be implemented in hardware, software, or a combination of hardware and software. Software components of the VSM 100 can reside in one or more servers or like computing devices or machines. The servers or like computing devices or machines may comprise one or more central processing units (processors) and one or more memory devices. The structure and function of such servers and the like, are well known to those skilled in the art.

Figure 2A:
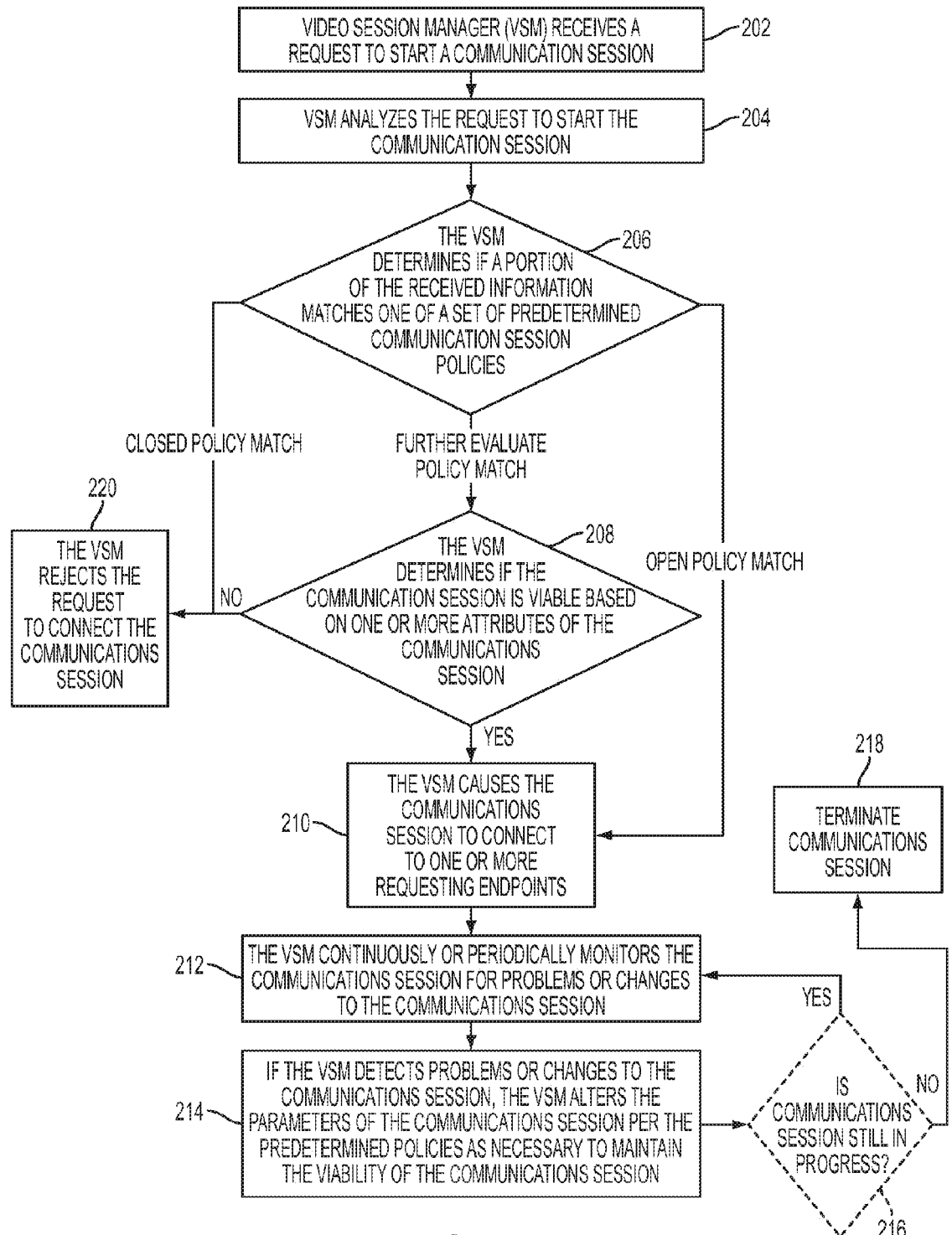
FIG. 2A is a flow chart showing an embodiment of the operational logic of the VSM.

FIG. 2A is a flow chart showing the operational logic of the VSM according to one embodiment of the present disclosure, after signaling and call control elements of a video communications session attempt have been triggered or requested via a communications session initiation process, as will be described further on. Starting in block 202, the VSM may receive session attempt requests. If the session attempt has been launched from a video endpoint in one of the domains, then that endpoint and/or the devices managing call control for that endpoint, may be configured to route the request to the VSM. The video session attempt signaling may include, without limitation, SIP or H.323. After the VSM receives the session attempt requests, the VSM in block 204 may examine the requests to start the communications session. In block 206, the VSM may perform a first level session viability inspection where it assesses information provided in the requests and determines whether a portion of this information matches one of a set of predetermined communication session policies. If the VSM finds an "open" policy match, the logic may flow to block 210, where session execution steps are triggered by the VSM to connect the one or more requesting endpoints. If the VSM finds a "closed" policy match, the logic may flow to block 220, where the VSM rejects the request(s) to connect the communications session. Depending upon the nature of the endpoint that requested the session, and the policies that govern that endpoint, the VSM can be constructed and adapted to provide data, audio or video feedback as to why the session was rejected so that, for example, the user may be able to try again in a different manner. If the VSM finds a "further evaluate" policy match in block 206, the logic may flow to block 208, where the VSM performs a second level session viability inspection. In the second level session viability inspection, the VSM may determine whether the communications session is viable based on one or more attributes of the communications session. If the VSM determines that the session is not viable, the logic may flow to block 220, where the VSM rejects the corresponding request(s) to connect the communications session. If the VSM determines the session is viable, the logic may flow to block 206, where session execution steps may be triggered by the VSM to connect the one or more requesting endpoints. After connection of the one or more requesting endpoints, the logic may flow to block 212, where the VSM continuously or periodically monitors the communications session for problems with or changes to the session. If the VSM detects a problem with or a change in the session, the logic may flow to block 214, where the VSM may alter the parameters of the session in accordance with the predetermined policies, in order to maintain viability of the communications session, and then determines in block 216, whether the communications session is still in progress. If the session is still in progress, the logic may return to block 212 where the VSM continuously or periodically monitors the communications session for problems with, or changes to the session. If the session is not in progress, the logic may flow to block 218 where the VSM may terminate the communications session.

In the first level session viability inspection of block 206, the VSM may assess information provided in the requests and may determine whether a portion of this information matches one of a set of predetermined communication session policies. In this process, the VSM may initially identify signaling fields to determine the originating entity and requested destination, and correlate this information with the VSM's backend databases (which can be stored in memory and/or disk), in order to determine what administrative domain each request belongs to. Identification can be based on any field or combinations of fields including, without limitation, name, type, IP address, MAC address, URI, unique ID, and/or domain membership. The policies for the involved domains and endpoints may then be analyzed and acted upon. Any policy can be defined in the VSM (e.g., defined in a policy engine component of the VSM) and all domains can control their own VSM, choosing their own policies and parameters. For example, global policy choices governing initial inspection can include the open, closed, and further evaluate policies described earlier. The open policy can include initially assuming that all calls between the domains (or within the single domain if both calls are in one domain), irrespective of endpoint type or the attributes requested in the call, are viable, therefore, the VSM may pass the session to the next step without doing further validation. The closed policy can include restricting all calls matching the involved domains, therefore, the VSM may reject the session immediately, at times with user feedback as previously described. The evaluate policy can include requiring further evaluation based on the specifics of the endpoints and other call attributes, therefore, the VSM may proceed to the next step (block 208) in the session viability process. The choice of the policy can be made using policy algorithms to be described further on.

In the second level session viability inspection of block 208, if the initial inspection resulted in "evaluate", then the VSM examines other attributes of the attempted session and the involved networks and infrastructures, and compares them to the policies in place, and determines how to proceed. Any attribute can be added to the VSM, with for example and not limitation, five groups of common attributes being defined in the VSM as follows: (1) signaling, media and management types, ports and protocols supported by each endpoint and intermediate devices such as bridges, MCUs and SBCs; (2) the desired properties of the session including signaling encryption, media encryption, lawful intercept and collaboration types; (3) the resource requirements of the session including bandwidth, transcoding, transrating, image size, compression, motion handling, frames per second and QoS, as well as the capabilities of the networks and infrastructure including network types, interfaces, protocols, bandwidth, ports, computers, QoS schemes, security and encryption mechanisms, network border element characteristics such as firewalls, session border controllers and application gateways; (4) the policies needed for the session including usage, privacy, session launch types, topology hiding, identification, authentication and financial settlement; (5) the needs for integration with other services including voice, data, gaming, collaboration tools (e.g. digital whiteboarding), recording, streaming, media and other third-party services and applications. Based on attributes such as those, the VSM determines if the session is viable, in what manner, and what the VSM needs to do to enable the session. If it is not viable, then user feedback can be given via the methods described above. If it is viable, there are two possible VSM actions resulting from the inspection of those attributes, (1) the VSM will route the signaling to the destination indicated by the call signaling, staying in the call signaling for the duration of the session (e.g., by inserting a VSM SIP UA (user agent) in the session) or (2) the VSM can alter the session in order to make the session viable, optimized or processed according to policy (e.g., as illustrated in the embodiment shown in FIG. 1).

Figure 2B:
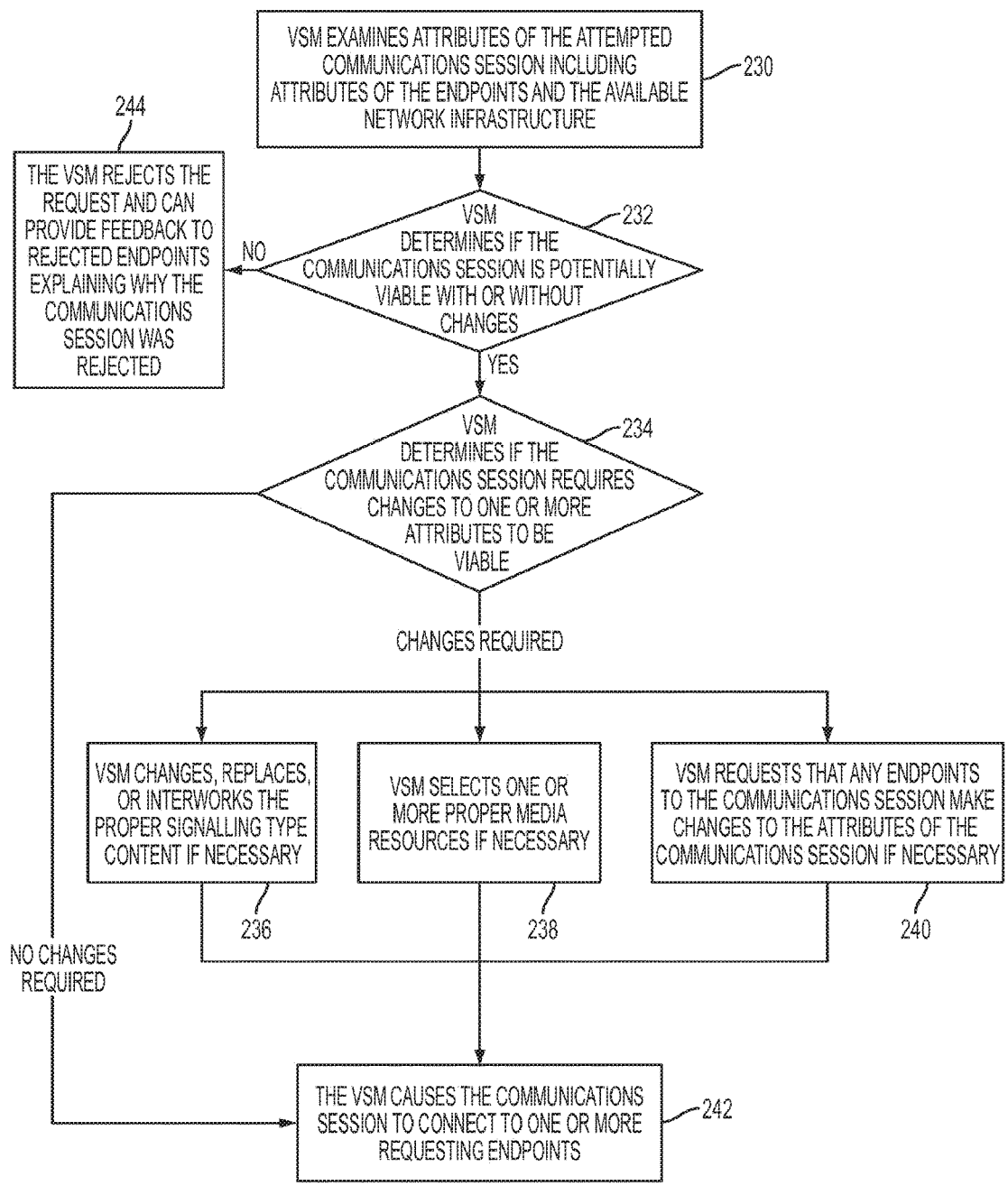
FIG. 2B is a flow chart showing an embodiment of the operational logic of a session viability determination aspect of the VSM.

FIG. 2B is a flowchart outlining the operational logic of the VSM's session viability determination capability (block 208 of FIG. 2A). Starting in block 230, the VSM examines attributes of the attempted communications including attributes of the endpoints and the available network infrastructure. The logic then flows to block 232 where the VSM determines whether the communications session is potentially viable with or without changes. In block 244, the VSM rejects the request if it determines in block 232 that the communications session is not viable. In rejecting the request, the VSM may provide feedback to the rejected endpoints explaining the reason(s) for rejecting the communications session. If the VSM determines in block 232 that the communications session is viable, then the logic flow to block 234 where the VSM determines whether the communications session requires changes to one or more attributes thereof to be viable. If the VSM determines in block 234 that no changes are required, the logic flows to block 242 where the VSM causes the communications session to connect to one or more requesting endpoints (block 210 of FIG. 2A). If, however, the VSM determines in block 234 that changes are required, the logic may flow to one or more of blocks 236, 238 and 240. If required, the VSM changes, replaces or interworks the proper signaling type content in block 236, selects one or more proper media resources in block 238, and/or requests that any endpoints to the communications session make changes to the attributes of the communications session in block 240. Once changes to the one or more attributes have been made, the logic flows to block 242 where the VSM causes the communications session to connect to one or more requesting endpoints (block 210 of FIG. 2A).

In one embodiment, in accordance with block 238, the VSM can be configured to allocate the proper media resources from one or more dynamic pools of logical ports for each endpoint in a communications session. For example, at least two or more available logical ports in one or more MCU's can be grouped into a pool of logical ports that can be allocated on the fly to connect endpoints for a particular communication session handled by a VSM. It should be appreciated that, the dynamic allocation of logical ports could include, but is not limited to, allocating logical port capacity within one or more devices (like MCUs) in a particular location or even one or more devices within one or more different geographical locations. In one such embodiment, in accordance with block 238, the VSM can identify the quantity of logical ports that are permitted for a host to use in a communications session from information stored in association with the host (e.g., the number of logical ports that the host paid to use in a communications session). The VSM can compare the quantity of logical ports that are permitted for the host against a pool of available logical ports to determine if the quantity of logical ports that are permitted for the host are available to be assigned to the host from the pool. If the pool of available logical ports includes enough ports, the VSM will assign to the host, for use in the host's communications session, the quantity of logical ports from the pool that is equivalent to the quantity of logical ports that is permitted for the host. In an alternative embodiment, the VSM will assign the quantity of logical ports from the pool that is equivalent to the quantity of logical ports that the host actually needs for a communication session, up to the quantity of logical ports that are permitted for the host (e.g., if the host paid for twelve ports for use in a communications session, but only requires three ports for a particular communications session, the VSM will allocate three ports rather than twelve ports).

In one embodiment, where the VSM allocates a smaller quantity of ports to a communications session than a host is permitted to use, the VSM can be configured to allocate additional logical ports to the communications session, at any time, from the pool (if ports are available in the pool). This may occur, for example, when additional endpoints attempt to join a host's communications session after the communications session has already started.

In one embodiment, in accordance with block 238 and under a best effort quality of service, the VSM treats the pool of logical ports under a first come, first serve basis. That is, the logical ports in a pool can be assigned to hosts for a communications session so long as logical ports are available in the pool. In one such situation, when the pool has run out of logical ports, a host may be unable to hold a communications sessions with one or more endpoints because there are not enough logical ports for the communications session.

In an alternative embodiment, the VSM can be configured to dynamically handle port contention or port congestion when a pool of logical ports does not have enough ports available for a communications session. This may occur, in one embodiment, where a host has paid for a premium service that guarantees that a certain number of ports will be available anytime that the host initiates a communications session. In one such embodiment, where a host is entitled to a certain number of ports for a communications session and the ports are not available, the VSM can examine attributes of other active communications sessions to determine if logical ports that have been allocated to the other active communications sessions can be freed up and reallocated to the host. In one embodiment, the VSM can determine what logical ports have been allocated to another communications session, but are not being used for the communications session (e.g., if another host paid for twelve ports for use in a communications session, but is only using four ports for a particular communications session, the VSM can determine that the unused eight other logical ports can be placed back into the pool and reallocated to the host, or reallocated directly to the host). It should be appreciated, that in one embodiment, the VSM may periodically examine allocated, but unused logical ports in one or more active communications sessions for reallocation to a pool of logical ports independent of whether the pool of logical ports has run out of ports or whether the pool is below a threshold quantity of logical ports. For example, the VSM may reallocate unused logical ports to a pool after the logical ports remain unused in an active communications session for more than a predetermined period of time (e.g., a certain number of minutes like 3, 5, 10, etc.).

In another such embodiment, where a host is entitled to a certain number of ports for a communications session and the ports are not available, the VSM can examine attributes of the other hosts of active communications sessions to determine if one host has priority over another host for allocation of logical ports. In one such embodiment, if a host has paid for guaranteed allocation of a certain quantity of ports and the pool of logical ports does not have enough ports to satisfy this guarantee, the VSM can be configured to look for ports that are allocated to another host that did not pay for a guaranteed number of ports. If the VSM finds another host that did not pay for a guaranteed number of ports, the VSM can be configured to reallocate this other hosts ports (even if the ports are actually in use by the other host) to the pool of logical ports or reallocate the other host's ports to the host that paid for the guaranteed allocation of a certain quantity of ports. In one embodiment, the VSM can be configured to provide an indication to the other host (and/or its' participants) that the other host will lose one or more ports as part of a port reallocation. The indication to the other host about the port reallocation can be though a video message, audio message, and/or text in ticker scroll that the VSM can provide to the other host (and/or its' participants). In this manner, the host and its participants will know that there is not a technical problem with the communications session if one or more endpoints are removed from the communications session. It should be appreciated that the VSM can provide the indication before, during, or after the port reallocation is performed. It should also be appreciated that the VSM can provide indications to any host (and/or its participants) regarding any status information associated with a communications session.

In another embodiment, in accordance with block 238, the VSM can be configured to allocate the proper media resources depending on the type of endpoint that is joining a communications session. In one such embodiment, if the VSM detects that three endpoints are joining a communications session, but two of the endpoints are capable of video while another endpoint is only capable of audio, the VSM can be configured to allocate logical ports on a video bridge for the two video endpoints, allocate a logical port on an audio bridge for the endpoint that is only capable of audio, while still bridging the three endpoints together for a communications session.

The embodiment shown in FIG. 1 illustrates one example of how the VSM can alter the session in order to make it viable, optimized or processed according to policy. In FIG. 1, user abc on an enterprise LAN 118 initiates a video session attempt. In this example, the session attempt is dialed as an H.323 call to user 123 on a public WiFi 120. The video call is routed over a network connection 1 (e.g., private or public IP (internet protocol)) to the SP (service provider) router 110. The load balancers 112 take the signaling and direct it to the session managers 102. The load balancers 112 balance the load, provide resiliency and can also enact policy sets and perform signaling manipulations, if necessary. The session managers 102 examine headers in the signaling and determine that the call should proceed. The session managers 102 execute algorithms based on the SIP headers, the VSM data, and the VSM policy sets, to determine that the call needs to be routed to the MCU 116 in order for the session to complete according to policy. Furthermore, the VSM 100 determines that the users are required to authenticate themselves via the IVR system 106 with PIN codes. In the embodiment shown in FIG. 1, some of the data and services used to make the above determination are virtualized across servers (e.g. the IVR system 106 and backend servers 104) that are not co-resident with the session managers 102. In other embodiments, this determination could take place in one physical "box," one virtualized environment, or multiple environments. The session managers 102 then request authentication 5 (PIN code) from the IVR system 106. The IVR system 106 authenticates, performs a SIP REFER to exit the call signaling, and returns the call to the session managers 102. The IVR system 106 can be any type of authentication server and can authenticate based on information it owns or can communicate 6 with the VSM 100, to determine if the PINs are valid. In this embodiment, the IVR system 106 is a component of the VSM 100, but it can also be an autonomous third component system. Depending upon certain variables, the VSM 10 offers the flexibility to use or not use the IVR system 106 for authentication on a given session. For example, in other embodiments, the VSM can be configured to use passive authentication mechanisms, rather than the IVR (which is intrusive). In such embodiments, incoming signaling may be parsed and matched to VSM databases and policies to determine if the endpoint, client or application can be enabled to continue to proceed without IVR PIN based authentication. In other such embodiments, digits or other mechanisms may be appended to the inbound call signaling such that downstream systems recognize the session as authenticated, without needing to prompt the caller to enter an IVR PIN or other information. The session managers 102 routes user abc to the MCU 116 due to certain policies, constraints and capabilities. Due to policy, the session managers 102 set the session up as an MCU bridged call, rather than a direct dial call, so the session managers 102 then bridges user 123@xyz into the call. From user 123's perspective, he or she is accepting an inbound call from user abc. User 123 does not know that the call is actually bridged by the VSM 100 and the MCU 116. Because user 123 supports SIP, but user abc originated the call as H.323, the VSM 100 needs to intervene to make the call work, routing the segment through the signaling server 114, which is capable of interworking the H.323 to SIP before sending to user 123. In alternative embodiments, the MCU 116 can handle the functions of the signaling server 114.

In the embodiment shown in FIG. 1, the VSM 100 may take action to alter the session because of the following attributes: 1) user 123@xyz.com supports SIP and user abc supports H.323; 2) media encryption is required by user abc and that both endpoints can support media encryption; (3) bandwidth constraints on mean that resolution should be limited to 720 p; (4) security or privacy requirements from user abc means that the call has to be bridged, which in turn means that the call could not be permitted to flow directly between the endpoints, and that user abc would need to authenticate the session via the entering of the PIN code; and (5) there is no need for integration with other services. The combination of those attributes in the embodiment shown in FIG. 1, means that the session would not have been realized using prior art methods, but can be realized by the VSM of the present disclosure.

The VSM can be programmed to modify a session for interoperability, optimizations and/or policy adherence in any manner. Certain basic types of modifications (interventions), described further on, can be used independently or in conjunction with one another. In the embodiment shown in FIG. 1 and described above, all of such types of modification are utilized. In all the intervention types, the VSM abstracts the end user from the intervention such that the end user has the same experience as if he or she is making a direct video call even if, for example, the session is routed and transported to various locations in a network, in order to bridge the non-interoperable segments. In this way, the problems and limitations of prior art methods are solved without the users being aware of them. The end user can be using a standalone video endpoint, a video client on a PC or mobile device, or an application that is leveraging video within the greater context of the application.

One of the interventions mentioned above changes, replaces or interworks the signaling type or content. This may include changing/inserting packet headers, SIP SDP fields, H.323 fields and interworking signaling between different protocols such as serving as a gateway function to evolving protocols such as WebRTC or SVC (Scalable Video Coding). This can include the routing of the session signaling to other transit resources which may insert their own signaling information or interwork between protocols, for example external signaling gateways. In the embodiment shown in FIG. 1, this type of intervention may be used to route the leg from the MCU 116 to the signaling server or gateway 114, in order to interwork from H.323 to SIP.

Another one of the interventions invokes media resources to make the session interoperable. This can include the re-routing of the session media to media resources such as MCUs and/or gateways. In the embodiment shown in FIG. 1, the VSM 100 invokes the MCU 116 or other suitable media server, to bridge the two segments, because the policies (or the technology used by the endpoints) prohibited the endpoints (e.g. users abc and 123) from communicating directly with one another, but the policies permit each of the endpoints to communicate independently with the MCU 116, with the MCU bridging the session. In addition, users will likely have access to devices that contain multiple codecs, or may initiate calls from applications or web clients that have access to multiple devices (each potentially with their own media codecs). This may likely take place in scenarios where a video client on a tablet or mobile device may support a codec like VP8, whereas the user's video unit or client on his/her PC may support H.264. In one embodiment, a single device/application may support multiple media codecs. In these cases, the VSM could recognize the choice of media codecs and indirectly affect the choice by directing the call to a media server that can provide/prefer the codec that the VSM wants to engage (due to interoperability, policy, QoS, costs, resource availability, etc.), or directing a media server to initiate a call to the device/codec of choice.

Another one of the interventions includes: signaling back to the initiating endpoint; requesting a change of protocol, connection method, resource request or compression scheme; or initiating a new leg and bridging that leg with other legs. This may be done via proxy elements. In the embodiment shown in FIG. 1, the VSM 100 invokes a new session between the MCU 116 and user 123, in order to enable the call to take place without the users needing to re-dial into a bridge, potentially needing to re-schedule such a dial-in bridged call. The VSM 100, therefore, abstracts the end users from the incompatibility between their video endpoints, making the call appear to be a direct dial call from one endpoint to the other, when in fact the VSM 100 invoked other resources, such as the MCU 116 in the middle.

As indicated in block 212 of FIG. 2A, once the session is initiated, the VSM can stay in the signaling path such that the VSM can operate to manage the session in real-time. Thus, the VSM can be constructed and adapted to: 1) algorithmically manage the initial video call initiation; and 2) stay for the duration, continually optimizing and managing the video path by proactively and reactively monitoring actions during the session.

Figure 3:
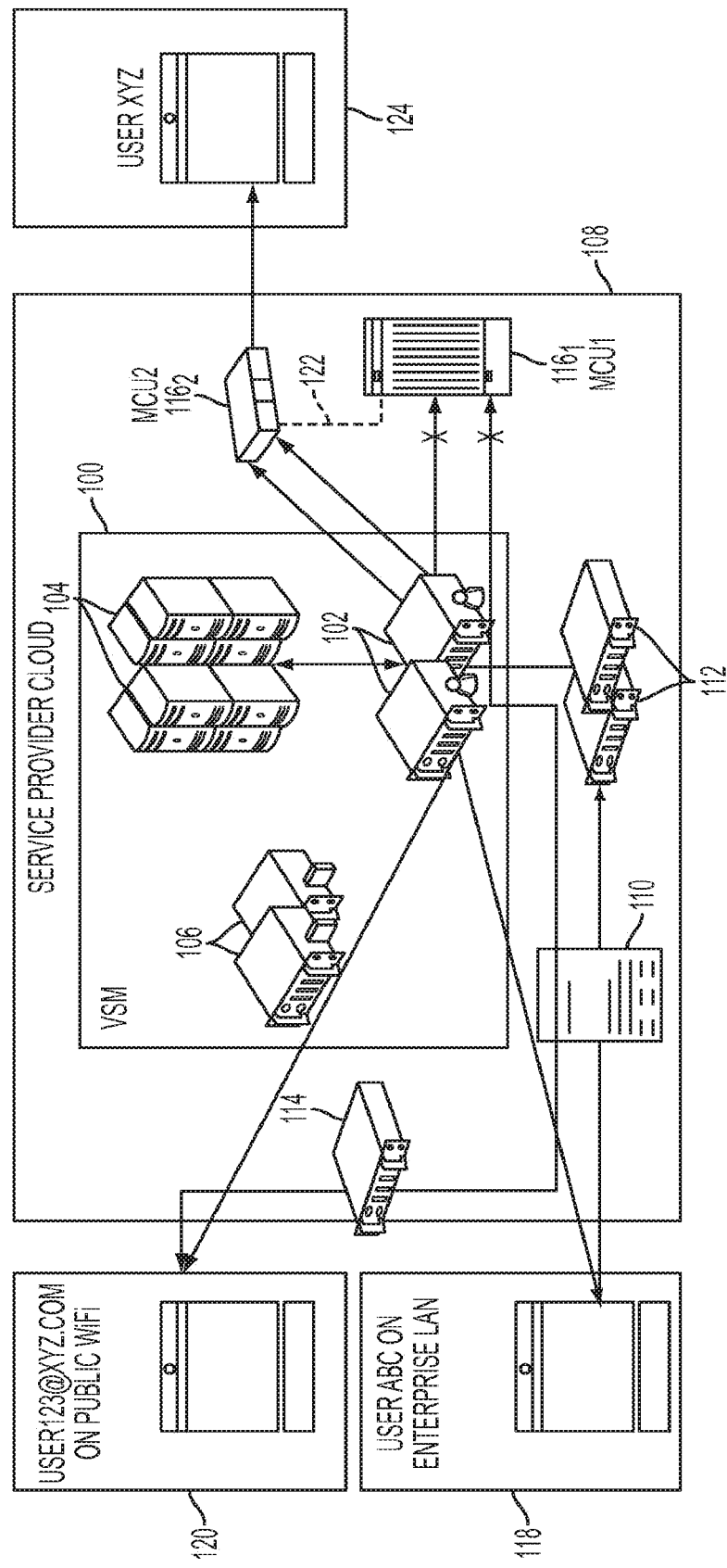
FIG. 3 illustrates reactive actions performed by the VSM embodied in FIG. 1.

FIG. 3 illustrates reactive actions performed by the VSM 100. Starting with the scenario depicted in the embodiment shown FIG. 1, where two users are on a bridged call on MCU $116_1$, user abc in FIG. 3 now wants to add user xyz to the video and therefore, dials user xyz. This call is routed to the session managers 102 in the same manner as described earlier with respect to the embodiment shown in FIG. 1. The VSM 100 may determine that adding user xyz to the current session or conference will be possible on a second media source, e.g., MCU $116_2$. Accordingly, the VSM 100 must move the current session or conference to MCU $116_2$ and join in user xyz. This VSM determination could be due to a number of factors including, without limitation, the lack of interoperability between MCU $116_1$ and user xyz, the lack of available ports or resources on MCU $116_1$ for another user, a policy for user xyz that makes MCU $116_1$ ineligible for any user xyz conference, and the like. Therefore, as shown in FIG. 3, the session managers 102 may use a SIP REFER method to initiate new sessions between user 123 and MCU $116_2$ and user abc and MCU $116_2$, join these two users on a conference bridge on MCU $116_2$ and terminate the prior session or conference on MCU $116_1$. In addition, the session managers 102 may initiate a request to MCU $116_2$ to send a call to user xyz from the conference created on MCU $116_2$. This can be implemented via an API between the MCU $116_2$ and the session managers 102. The MCU $116_2$ then connects user xyz into the session or conference.

In other embodiments, a cascade link 122 (depicted by the broken line in FIG. 3) between MCU $116_1$ and MCU $116_2$ can be established such that MCU $116_1$ and MCU $116_2$ may each host different users an the cascade link 122 connecting the conferences. Further in FIG. 3, it should be understood that line 4 extending between user 123 and the session managers 102 and line 3 extending between user abc and the session managers 102, represent logic and not physical signaling. Physical signaling is still routed through the load balancers 112, router 110, switches (not shown), and the like, between the SP cloud 108 and the enterprises 118, 120, 124.

Figure 4:
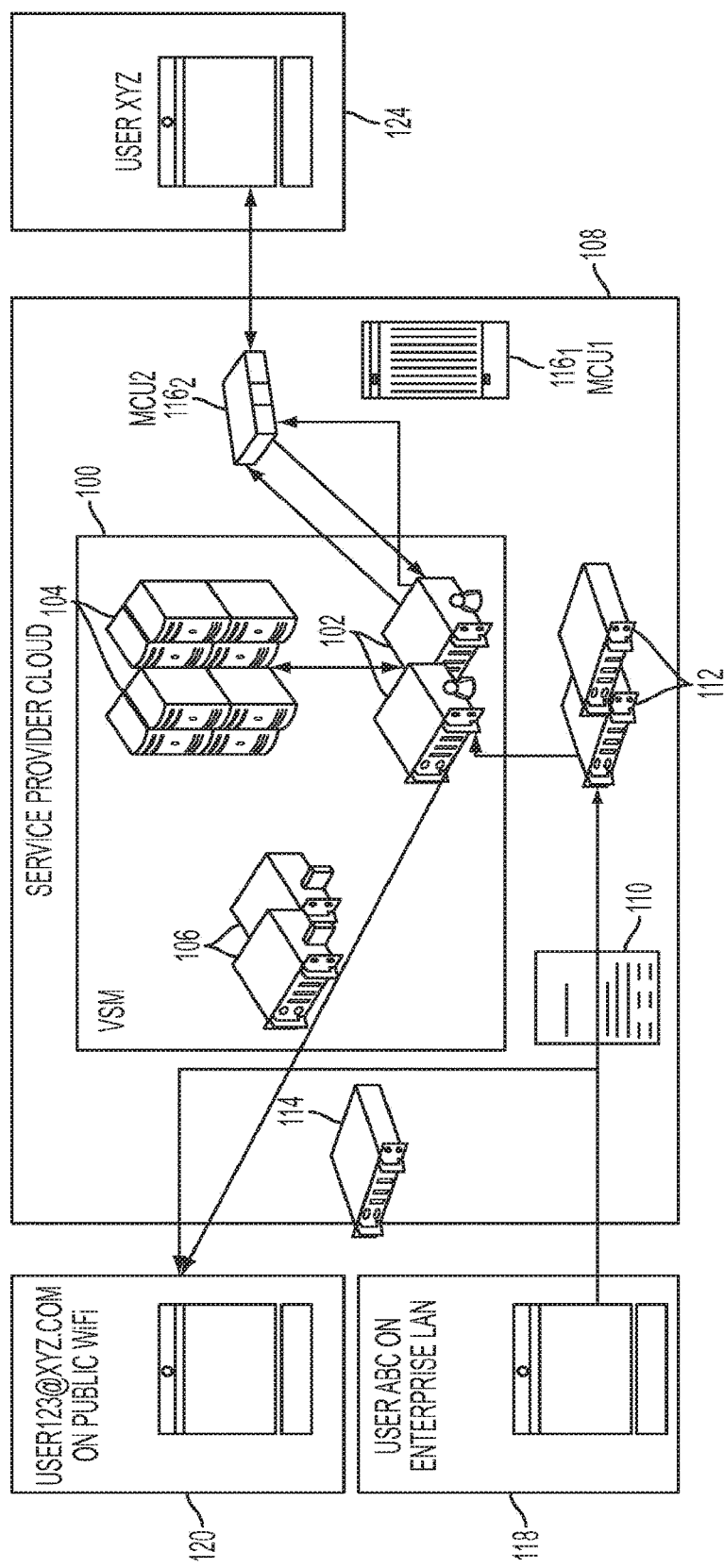
FIG. 4 illustrates proactive actions performed by the VSM embodied FIG. 1.

FIG. 4 illustrates proactive actions performed by the VSM 100. Starting with the scenario depicted in FIG. 3, where three users are on a bridged call on MCU $116_2$, the session managers 102 may determine in FIG. 4 that user 123 is having quality issues. This determination can be made from many factors as described further on. In a similar manner, the VSM 100 can determine that the network may be recovered from a transient quality issue. After determining user 123's quality issue, the session managers 102 may request MCU $116_2$ via logic signaling line 2, to signal user 123's video unit 120 to decrease resolution from 720 p to 384 k (or send a message to user 123 recommending that user 123 decrease resolution, e.g., a message that can be sent with the video or via a separate channel such as a mobile app, IM or SMS), the request is routed to user 123 via logic lines 3, and user 123 successfully decreases resolution. This process is repeated during the conference. If the session managers 102 get no further quality issue feedback after a certain selected time period, e.g., 5 minutes, the VSM 100 can request MCU $116_2$ to signal users 123's video unit 120 to increase resolution back to 720 p. This action is successful because the session managers do not receive any further quality issue feedback, which indicates that the first network quality issue was transient in nature and now resolved. Policies and algorithms can determine the session managers' subsequent actions if further quality issues are found.

As illustrated above in FIG. 4, the proactive actions performed by the VSM can include modifying the session in reaction to network and resource conditions, or predicted conditions. Such conditions may include without limitation, if bandwidth becomes constrained, jitter is above threshold, media resources are unavailable or bridge ports are constrained. Policies determine if the VSM takes action, for example but not limitation, customers may need to buy a platinum video service in order to get this feature, in which case the VSM will take action if the platinum policy is in place for the specific conference. Similarly, the aggressiveness of the VSM can be bounded by policies, for example but not limitation, one policy may request the VSM to take action at 5% packet loss, but another policy may be tolerant up to 10% packet loss. The information on network and resource conditions can be procured directly by the VSM or the VSM may source it from other systems and network elements. The information typically comes from SNMP queries (simple network management protocol) to network elements, analysis of log files and from external network monitoring applications, which can observe actual traffic or generate their own test traffic in order to generate data. For predicted conditions, the VSM may use combinations of predictions made from historical trending data, as well as knowledge of upcoming events, such as new sessions that are scheduled to start in upcoming time periods. The VSM actions can be continuous, as illustrated in FIG. 4, where the VSM first downgrades the resolution to react to a network issue, but then upgrades it to test if the issue is resolved. In the embodiment of FIG. 4, the issue is resolved and the VSM can leave the upgraded resolution in place. Policies again determine how aggressive the VSM's actions are, with configurable timers for trying to increase resolution back (e.g. wait x minutes, then try to increase resolution) and configurable attempt settings (e.g. try up to x times to increase resolution in a given session or time period, then if network degrades each time stop trying and leave resolution at the setting that clears the network issue).

For the proactive VSM session modifications listed above, the VSM can trigger changes in session compression, motion handling, quality, and resolution in order to better utilize resources. The VSM can also trigger changes to the physical network path to address network issues. The VSM can also move the session to new signaling, media and/or bridge resources if necessary, as illustrated in the embodiment of FIG. 3 and described above. In the embodiment shown in FIG. 3, the path is moved or switched to MCU $116_2$ from MCU $116_1$. The reason for this can be, for example and not limitation, that MCU $116_2$ was in a different network location then MCU $116_1$ and therefore, the VSM 100 moved the call to MCU $116_2$ in order to avoid a network issue that was specific to the path with MCU $116_1$. In this embodiment, the MCU $116_1$ is at the end of the media flow, and so changing MCUs changes the network path. In other embodiments, intermediate elements can be changed to achieve the same goal of modifying the network path, for example the VSM can invoke routers or TURN servers to re-direct traffic to a network path that has better quality.

Reactive VSM session modifications can include managing requests from users, endpoints, policy or other systems, to add other media types, applications, services, content or functionality. In such reactive VSM session modifications, the VSM can bridge in collaboration applications, add video streamed from a third party source, interleave advertising content, add new users or add a periodic or constant streamer or ticker to the session. Such actions can be scheduled, part of policy or executed on demand. As described earlier, the embodiment of FIG. 3 depicts a scenario in which the telepresence session wishes to add a third video endpoint (user xyz), but that video endpoint is not compatible with the MCU $116_1$ hosting the video conference. As illustrated in FIG. 3, the VSM 100 is capable of recognizing this issue, determining that a different MCU $116_2$ can host the video conference, moving the existing two participants (users abc and 123) to the new MCU $116_2$, and bridge in the new participant (user xyz). All of this performed behind the scenes, abstracted from the users, whom simply dialed in a new endpoint directly and watched it work. This abstraction allows the VSM of the present disclosure to avoid the issues with the current methods where most of these types of video sessions are not even attempted, as they would fail or are perceived to fail.

The VSM can also be operative in the termination of the session or some of the session segments. The VSM may terminate segments at a specific time in order to enforce conference end times, financial agreements or prioritization policies. Prioritization policies can include resource contention scenarios in which some segments/conferences are terminated in order to use the resources for higher priority segments/conferences. An example of this can include, without limitation, a certain enterprise having more video endpoints than bandwidth, which is a common deployment. The enterprise may set a policy in the VSM that scheduled conferences take priority over non-scheduled conferences, in the event of bandwidth contention. This type of policy can't be executed in the prior art because the combination of the real-time call control of the VSM and the algorithms and policies of the VSM do not exist (for example, a prior art SBC has call control but is not programmable with the algorithms and polices, or able to access data to, for example, know that scheduled conferences are about to start). The VSM of the present disclosure, however, in this example proactively realizes that there will be contention at a certain time, e.g., 5 p.m., due to the start of a scheduled conference at that time. The VSM then executes a policy which states to play an audio or video message for the participants in the non-scheduled conference, informing them that their conference will be terminated at 5 p.m. due to the contention and the policy.

As mentioned earlier, the VSM in some embodiments may be constructed and adapted to perform communications session initiation, where the VSM can be used for determining and enabling the initiation of a video communications session. More specifically, the VSM is constructed and adapted to provide directory, authentication, policy and/or session launch services, which allows the VSM to determine how to launch call attempts and initiate communications sessions. Thus, "user one" (the requestor—can be the session initiator (e.g., user abc in FIG. 1), organizer/administrator/moderator, or host) can reach "user two" via the VSM. User two can be the individual(s) (e.g., user 123 in FIG. 1) and/or resource(s), such as a bridge or MCU, that user one wants to participate in the video session.

In other embodiments, the session initiation function can be performed by other systems because the VSM can be constructed and adapted to enable the users to leverage external providers of such services by providing machine to machine APIs (application program interfaces) which enable external providers of these services (e.g. an organization's groupware, presence, workflow or instant messaging application) to trigger the request to the VSM as described previously.

The VSM can be constructed and adapted to provide a plurality of options for session initiation: single phase authentication; two phase authentication; and segment authentication. In addition, a set of hierarchical policies across multiple policy levels enables administrators to determine which of the session initiation options is available to a user for each desired communications session.

Figure 6A:
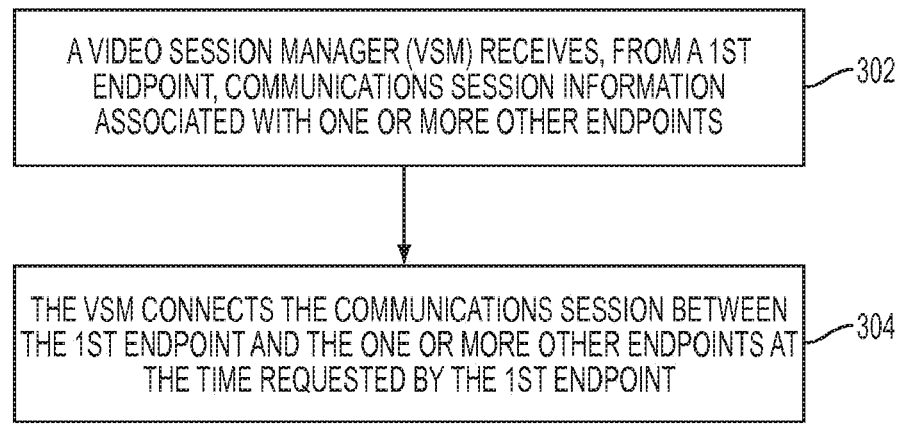
FIG. 6A is a flow chart illustrating an embodiment of single phase authentication method for session initiation.

FIG. 6A is a flow chart illustrating session initiation using single phase authentication according to an embodiment of the present disclosure. In block 302, the VSM enables user one to enter information (Table one of FIG. 5) to identify user two into a VSM interface (including external application interfaces working with the VSM via API), with the VSM then launching a video session between the users in block 304, either instantly or at the time requested by user one. Policy administered by policy groups described further on, enables each administrator to determine which of the Table one and Table two information (FIG. 5) is required in order to initiate the session. In summary, the user two information described above is determined to be sufficient to authenticate the session.

Figure 6B:
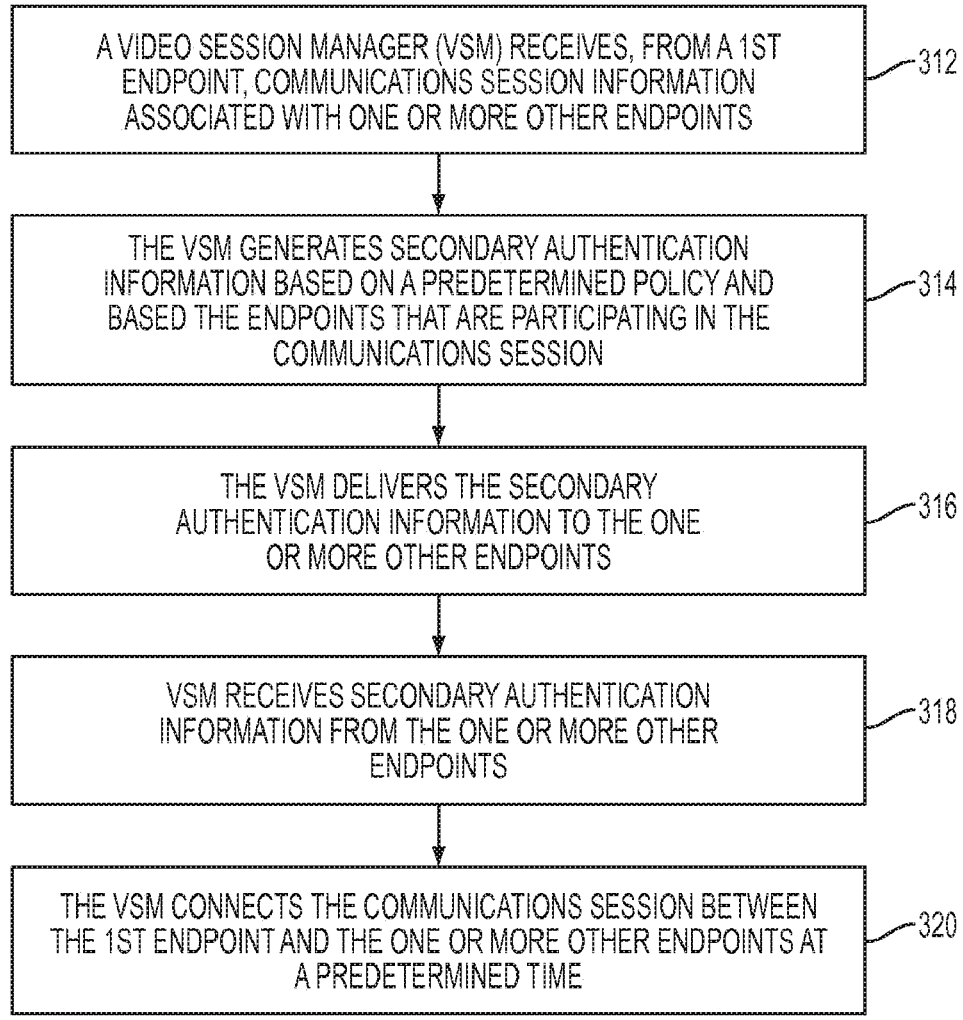
FIG. 6B is a flow chart illustrating an embodiment of two phase authentication method for session initiation.

FIG. 6B is a flow chart illustrating session initiation using two phase authentication according to an embodiment of the present disclosure. In block 312, the VSM enables user one to enter the user two identification information as described above in the single phase authentication option, and then in block 314, the VSM produces secondary session authentication information for the desired communications session as listed in Table two of FIG. 5. Policy, administered by the policy groups described in further on, enables each administrator to determine which of the Table two secondary authentication information is required in order to initiate the session. The VSM enables the policy to be different for each combination of users. In block 316, the VSM enables the secondary authentication mechanism to be directly delivered to user two by the VSM, or the VSM can pass the mechanism to user one, with user one then responsible for communicating it to user two. In block 318, the VSM enables user two to enter the secondary authentication information in order to initiate the session in block 320, either into a VSM interface or into a system that communicates the information to the VSM. In summary, user one is required to identify user one as described earlier in the single phase authentication option, and user two is required to enter the secondary authentication mechanism to authenticate the session.

Figure 6C:
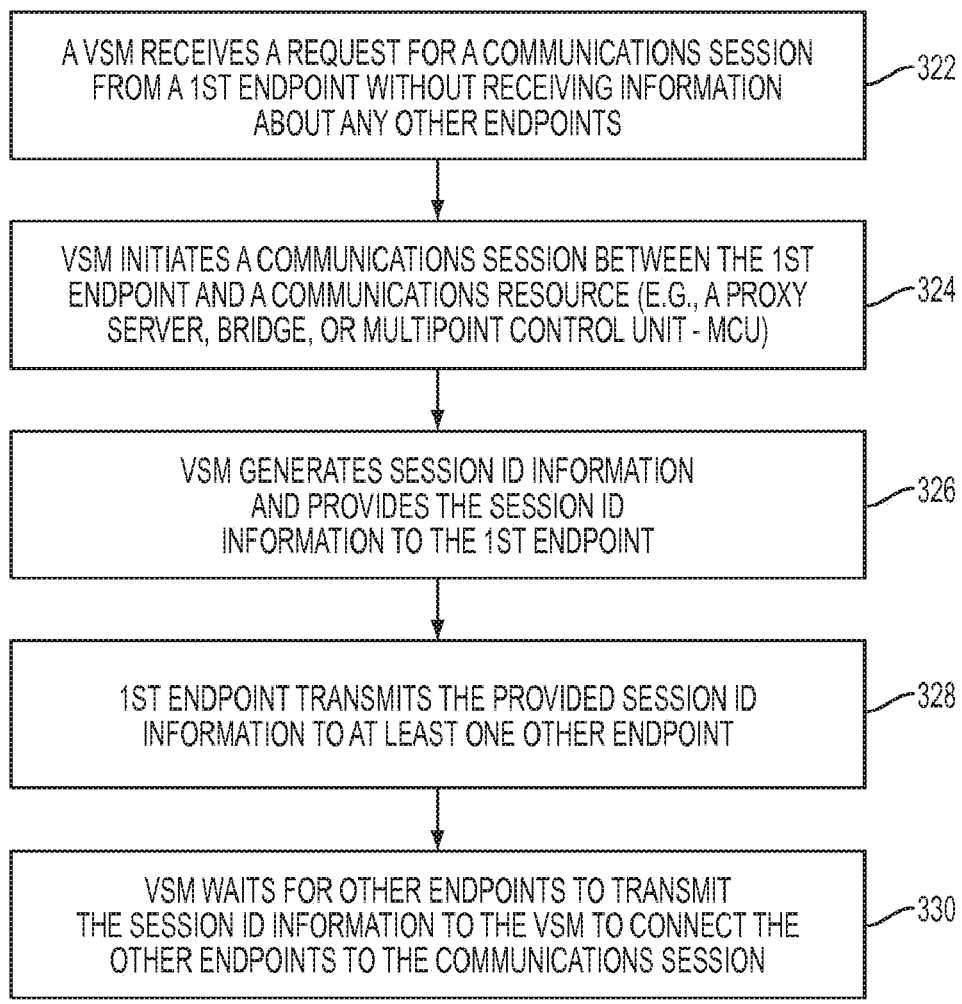
FIG. 6C is a flow chart illustrating an embodiment of segment authentication method for session initiation.

FIG. 6C is a flow chart illustrating session initiation using segment authentication according to an embodiment of the present disclosure. In block 322, the VSM enables user one to request a video session without providing any information about user two. In block 324, the VSM initiates a session between user one and a communications resource such as a proxy server, bridge or MCU. In block 326, the VSM then generates session ID information and provides it to user one. In block 328, user one communicates the session ID information to any other users. In block 330, the VSM waits for the other endpoints to transmit the session ID information to the VSM to connect the other endpoints to the communications session. User two is therefore, independently responsible for joining the session, using the VSM or other session initiation technology. In summary, user one is given an option to initiate a session without identifying other participants, with VSM producing information to enable those participants.

The VSM enables the three authentication options described above to be governed according to user preferences and policies that are applied in the VSM or related systems. In one embodiment, the VSM can enable the following policy groups: user (a person or individual video resource), user group (multiple users, e.g. a finance department), organization (multiple user groups, e.g. an enterprise), community (multiple organizations, e.g. enterprises in a supply chain extranet), service provider (an entity enabling communication services for organizations or users), exchange provider (an entity enabling communications across multiple service providers). As such, the VSM enables the administrators of each policy group to enable, restrict, prefer or default to any of the three session initiations options described above, as well as determine specific policies within each option. The most granular policy available (policy is optionally set for each of the available groups at the discretion of each administrator) takes precedence when different policies are set at different policy group levels, with user level being the most granular, and exchange provider being the least, however a restriction at any level is automatically carried all the way down to the user level. The VSM allows each of those policy groups to enable any or all of the three session initiation functions described above. When more than one of those options is available after all restrictions are accounted for, the user decides on a session by session basis which option to use.

While exemplary drawings and specific embodiments of the present disclosure have been described and illustrated, it is to be understood that that the scope of the invention as set forth in the claims is not to be limited to the particular embodiments discussed. Thus, the embodiments shall be regarded as illustrative rather than restrictive, and it should be understood that variations may be made in those embodiments by persons skilled in the art without departing from the scope of the invention as set forth in the claims that follow and their structural and functional equivalents.

What is claimed is:

1. A method comprising:
   receiving, by a session manager, a request from a first endpoint to establish a communications session with a second endpoint, wherein the communications session in the request has a first host;
   examining, by the session manager, one or more attributes of the communications session that the first endpoint is attempting to establish;
   determining, by the session manager, whether the attempted communications session requires changes to the one or more attributes thereof to be viable;
   changing, by the session manager, a first attribute in the one or more attributes in response to determining that changes are required, wherein the changing of the first attribute includes:
   (a) examining, by the session manager, attributes of a second host, wherein the second host is hosting an active communications session and is different from the first host,
   (b) determining, by the session manager, that the first host has priority for port allocation over the second host, in response to the examining of the attributes, and
   (c) reallocating, by the session manager, one or more ports in the active communications session to the first host, in response to determining that the first host has priority over the second host; and
   connecting, by the session manager, the first and second endpoints to the communications session after the first attribute has been changed.

2. The method of claim 1, wherein the step of examining further includes:
   examining, by the session manager, one or more attributes of the first and second endpoints, including network infrastructures available for establishing the communications session.

3. The method of claim 1, wherein the step of changing includes:
   determining, by the session manager, how many ports the first endpoint requires to establish the communications session;
   allocating, by the session manager, ports from one or more pools of logical ports to the first endpoint in response to determining the number of ports the first endpoint requires; and
   assigning, by the session manager, the allocated ports to the first endpoint for use in the communications session.

4. The method of claim 3, wherein the ports are allocated from one or more multipoint control units located at one geographical location or at different geographical locations.

5. The method of claim 1, wherein the step of changing includes:
   periodically examining, by the session manager, active communications sessions to determine whether one or more unused ports in the active communications sessions can be reallocated;
   reallocating, by the session manager, the one or more unused ports to a pool of logical ports when it is determined that the unused ports remain unused for a predetermined period of time; and
   assigning, by the session manager, at least one of the reallocated ports in the pool to the first endpoint for use in the communications session.

6. The method of claim 1,
   wherein the examining of the attributes includes, if the first host has paid for guaranteed allocation of a certain quantity of ports and a pool of ports does not have enough ports to satisfy the guaranteed allocation, looking for ports that are allocated to another host that did not pay for a guaranteed number of ports, and wherein the first host has priority over the second host because the second host did not pay for a guaranteed number of ports.

7. The method of claim 1 further comprising:
   transmitting, by the session manager, to the second host, an indication that the active communications session will have the one or more ports reallocated, wherein the indication is at least one of a video message, an audio message, and a text message.

8. The method of claim 1, wherein the port being reallocated by the session manager is in use by the second host.

9. The method of claim 1, wherein the step of changing includes:
  detecting by the session manager that:
    (i) the first and second endpoints are configured to communicate via a first media, and
    (ii) a third endpoint is only configured to communicate via a second media that is different from the first media;
  allocating by the session manager:
    (i) a first port on a first bridge to the first and second endpoints, wherein the first port allows the first and second endpoints to communicate with each other via the first media during the communications session, and
    (ii) a second port on a second bridge to the third endpoint, wherein the second port allows the third endpoint to communicate with the first and second endpoints via the second media during the communications session.

10. The method of claim 1, wherein the step of changing includes:
  detecting by the session manager that:
    (i) the request transmitted by the first endpoint for establishing the communications session is in a first protocol, and
    (ii) the second endpoint supports a second protocol that is different than the first protocol;
  routing, by the session manager, the request through a signaling server that is configured to interwork the first protocol to the second protocol, wherein the signaling server is different than, and is remotely located from, the session manager.

11. The method of claim 1 further comprising:
  receiving, by the session manager, a request to add a third endpoint to the communications session, wherein the communications session is established on a first media source;
  determining, by the session manager, that adding the third endpoint to the communications session is possible on a second media source that is different than the first media source;
  moving, by the session manager, the communications session established on the first media source to the second media source; and
  connecting, by the session manager, the third endpoint to the communications session moved to the second media source, thereby allowing the third endpoint to communicate with the first and second endpoints.

12. The method of claim 1, wherein the session manager is configured to manage and optimize the communications session between the first and second endpoints in real-time and throughout the duration of the communications session.

13. An apparatus comprising:
  a non-transitory computer readable medium having one or more instructions stored therein; and
  a processor configured, based on the one or more instructions, to:
    (i) receive a request from a first endpoint to establish a communications session with a second endpoint, wherein the communications session in the request has a first host,
    (ii) examine one or more attributes of the communications session in which the first endpoint is attempting to establish,
    (iii) determine whether the attempted communications session requires changes to the one or more attributes thereof to be viable,
    (iv) change a first attribute in the one or more attributes in response to determining that changes are required, wherein change of the first attribute includes:
      (a) examining attributes of a second host, wherein the second host is hosting an active communications session and is different from the first host,
      (b) determining that the first host has priority for port allocation over the second host, in response to the examining of the attributes, and
      (c) reallocating one or more ports in the active communications session to the first host, in response to determining that the first host has priority over the second host, and
    (v) connect the first and second endpoints to the communications session after the first attribute has been changed.

14. The apparatus of claim 13, wherein the processor is further configured, based on the one or more instructions, to:
  determine how many ports the first endpoint requires to establish the communications session;
  allocate ports from one or more pools of logical ports to the first endpoint in response to determining the number of ports the first endpoint requires; and
  assign the allocated ports to the first endpoint for use in the communications session.

15. The apparatus of claim 13, wherein the processor is further configured, based on the one or more instructions, to:
  periodically examine active communications sessions to determine whether one or more unused ports in the active communications sessions can be reallocated;
  reallocate the one or more unused ports to a pool of logical ports when it is determined that the unused ports remain unused for a predetermined period of time; and
  assign at least one of the reallocated ports in the pool to the first endpoint for use in the communications session.

16. The apparatus of claim 13,
  wherein the examining of the attributes includes, if the first host has paid for guaranteed allocation of a certain quantity of ports and a pool of ports does not have enough ports to satisfy the guaranteed allocation, looking for ports that are allocated to another host that did not pay for a guaranteed number of ports, and wherein the first host has priority over the second host because the second host did not pay for a guaranteed number of ports.

17. The apparatus of claim 13, wherein the processor is further configured, based on the one or more instructions, to:
  detect that:
    (i) the first and second endpoints are configured to communicate via a first media, and
    (ii) a third endpoint is only configured to communicate via a second media that is different from the first media; and
  allocate:
    (i) a first port on a first bridge to the first and second endpoints, wherein the first port allows the first and second endpoints to communicate with each other via the first media during the communications session, and
    (ii) a second port on a second bridge to the third endpoint, wherein the second port allows the third endpoint to communicate with the first and second endpoints via the second media during the communications session.

18. The apparatus of claim 13, wherein the processor is further configured, based on the one or more instructions, to:

detect that:
- (i) the request transmitted by the first endpoint for establishing the communications session is in a first protocol, and
- (ii) the second endpoint supports a second protocol that is different than the first protocol; and route the request through a signaling server that is configured to interwork the first protocol to the second protocol, wherein the signaling server is different than, and is remotely located from, the session manager.

19. The apparatus of claim 13, wherein the processor is further configured, based on the one or more instructions, to:
receive a request to add a third endpoint to the communications session, wherein the communications session is established on a first media source;
determine that adding the third endpoint to the communications session is possible on a second media source that is different than the first media source;
move the communications session established on the first media source to the second media source; and
connect the third endpoint to the communications session moved to the second media source, thereby allowing the third endpoint to communicate with the first and second endpoints.

* * * * *